Feb. 11, 1930.  D. JONES  1,746,655
LUBRICATING DEVICE
Filed Oct. 26, 1927   2 Sheets-Sheet 1

Inventor
Deyo Jones
By John Harness
Attorney

Feb. 11, 1930.  D. JONES  1,746,655
LUBRICATING DEVICE
Filed Oct. 26, 1927   2 Sheets-Sheet 2

Inventor
Deyo Jones
By Jting Harness
Attorney

Patented Feb. 11, 1930

1,746,655

UNITED STATES PATENT OFFICE

DEYO JONES, OF DETROIT, MICHIGAN, ASSIGNOR TO A. CLARE FOX, OF GRAND RAPIDS, MICHIGAN

LUBRICATING DEVICE

Application filed October 26, 1927. Serial No. 228,714.

This invention relates to lubricating devices, and particularly to a device for automatically feeding lubricant to the bearing of a reciprocating member such as the connecting rod of a locomotive, the principal object being the provision of a new and novel device of the type described that will be simple in construction, efficient in operation and economical to manufacture and use.

Another object is the provision of an automatic lubricating device for the bearings of reciprocating members comprising a weight adapted to be reciprocated by inertia forces acting on the same during reciprocation of such member, a grease cup provided with a piston and non-rotatable piston rod, and means connecting the weight with the rod whereby reciprocation of the weight will cause axial movement of the rod and piston to force grease out of the grease cup and to the bearing surface to be lubricated.

Another object is to provide a device comprising a grease cup and an axially movable non-rotatable piston and rod within the grease cup for forcing grease to a bearing to be lubricated, an inertia actuated mass and suitable mechanism operated thereby being provided for causing axial movement of the piston and piston rod, the grease cup being so mounted as to be substantially out of thermal contact with the bearing to be lubricated.

Another object is to provide means whereby an axially movable piston may be moved by means of a reciprocating mass actuated by inertia forces acting thereon, the connection between the mass and the piston including a cam member.

A further object is to provide a device of the type described in which adjustable means are provided for controlling the extent of the reciprocating movement of the reciprocating mass, and other means are provided for rendering the reciprocation of the mass inoperative for moving the piston when the piston has moved a predetermined distance in the grease cup.

The above being among the objects of the present invention the same consists in certain features of construction and combination of parts to be hereinafter described with reference to the accompanying drawings, and then claimed, having the above and other objects in view.

In the accompanying drawings which illustrate a suitable embodiment of the present invention and in which like numerals refer to like parts throughout the several different views,—

Figures 1, 2, 3:
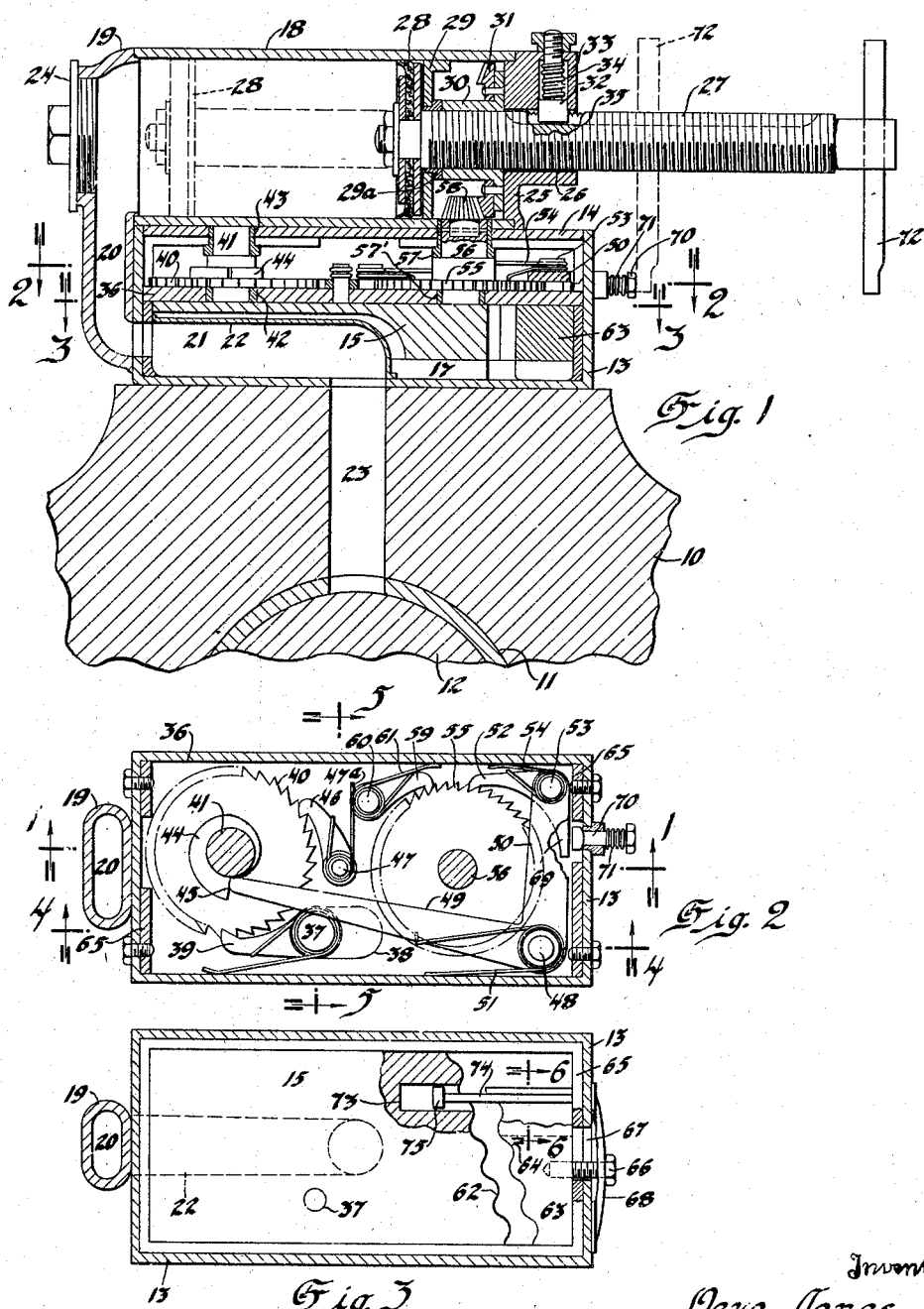
Fig. 1 is a vertical sectional view taken centrally through a lubricating device constructed in accordance with the present invention, as on the line 1—1 of Fig. 2, showing the same mounted upon a connecting rod a fragment of which is shown in section.
Fig. 2 is a horizontal sectional view taken on line 2—2 of Fig. 1.
Fig. 3 is a horizontal sectional view taken on the line 3—3 of Fig. 1.
Figure 4:
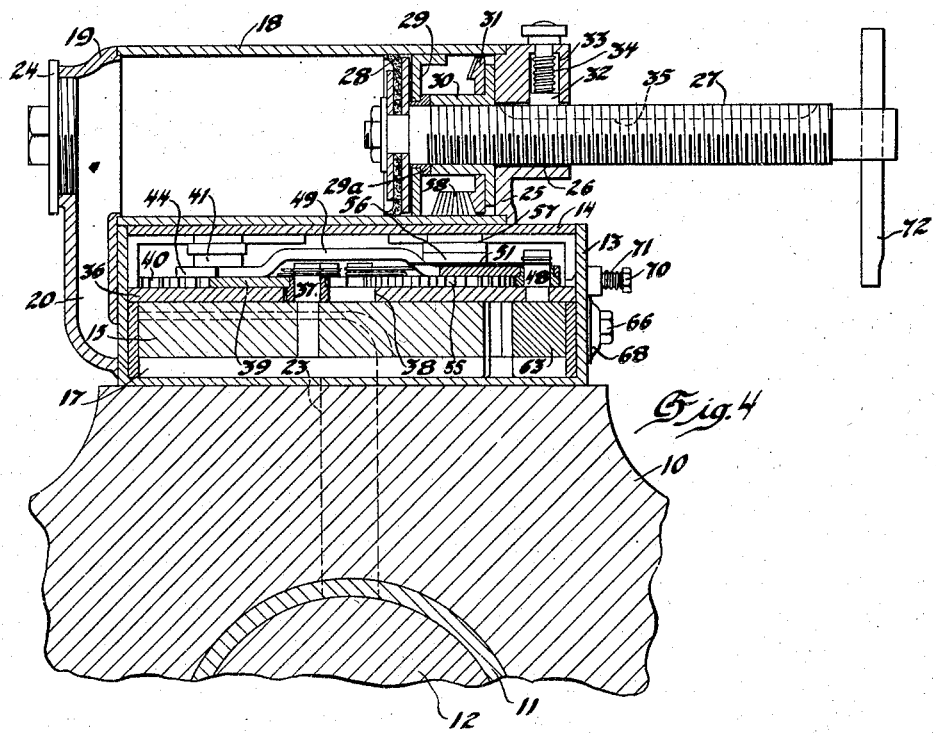
Fig. 4 is a view similar to Fig. 1 but taken on line 4—4 of Fig. 2.

It has been found in the past that the lubrication of the bearings of reciprocating members, such as connecting rods and the like, presents a very difficult problem, particularly where such members are not capable of being enclosed in an oil tight casing, this applying particularly to the connecting rods for the driving wheels of locomotives and the like which it is impossible to encase and which offer increased difficulty to lubrication because of the relatively great movement and variations of speed of the same.

The present invention provides a construction by which such bearings may be continually and effectively lubricated by the application of lubricant thereto by power means, such power being obtained through the reciprocation of the rod itself by the provision of a mass carried by the reciprocating member and having limited reciprocating movement in respect to the same. By the present invention I utilize the reciprocating movement of the mass to actuate mechanism whereby a piston is caused to move in a grease cup or other receptacle thus forcing the grease out of the same, such grease being led to the bearing to be lubricated.

In accordance with the present invention I show in the accompanying drawing a portion of a connecting rod or other reciprocating member 10 provided with a bearing 11 which receives the journal 12. Secured to the top face of the member 10 by suitable means (not shown) is a casing 13 having integral side and bottom walls and a separate top wall 14 secured thereto. The casing 13 is preferably formed from the sheet metal but may be formed equally well of other materials if thought desirable. Positioned within the casing 13 is a weight or mass 15 of substantially less length than the casing 13 and positioned with its length in the direction of reciprocation of the member 10. The weight 15 is of a width less than the interior width of the casing 13 and suitable bearing members 16 are provided between the side of the casing 13 and the sides of the weight 15 in order to insure proper sliding movement of the weight 15 with respect to the casing 13. A pair of shoes such as 17 are preferably provided on the bottom of the weight 15 for supporting the same from the bottom of the casing 13 to further insure free sliding movement of the weight 15. End plates such as 65 are preferably provided in the ends of the casing 13. Secured to the cover 14 is a cylinder 18 the axis of which extends in the direction of reciprocation of the member 10 and which is secured to the cover 14 by welding or otherwise. These two parts are preferably secured together in line contact for purposes which will be described later. The cylinder 18 is provided with a head 19 which has a portion which extends downwardly in contact with end face of the casing 13, such extending portion being provided with a passage 20 which connects with a passage 21 formed in the lower portion of the casing 13 by the inverted U-shaped sheet metal member 22 secured to the bottom face thereof, the portion 22 being connected by the opening 23 extending down through the bottom of the casing 13 and through the member 10 and bearing 11 to the journal 12, thus providing a continuous passage from the interior of the cylinder 18 to the journal 12. The mass 15 is cut out around the member 22 to accommodate the same in the casing 13. The head 19 is provided with a screw cover 24 which is removable in order to fill the interior of the cylinder 18 with grease or other lubricant. The opposite end of the cylinder 18 is closed by a head 25 provided with a central opening 26 in which a rod 27 is slidably received, the rod 27 being provided with suitable piston 28 secured thereto at one end within the cylinder 18. A fixed cross wall 29 is provided within the cylinder 18 between the piston 28 and the head 25. Threadably received on the rod 27 between the cross wall 29 and the head 25 is a sleeve 30. The sleeve 30 is of such a length as to simultaneously contact against the bushing 29ª fixed in the cross wall 29 and head 25, and is thereby confined against axial movement. Fixed to the sleeve 30 is a bevel gear 31. A plunger 32 projecting through the opening 33 in the head 25 transversely to the axis of the opening 26 is constantly urged by the spring 34 to a position within slot 35 formed in the outer surface of the rod 27 in parallel relationship to the axis thereof, the plunger 32 acting to prevent rotation of the rod 27 while allowing free axial movement thereof.

A horizontal plate or supporting member 36 is provided within the casing 13 in overlying relationship with respect to the mass 15. A pin 37 is secured against movement to the mass 15 and projects upwardly through an elongated slot 38 in the plate 36. Pivotally supported on the pin 37 above the plate 36 is a pawl 39, the free end of which engages the ratchet wheel 40 which is secured to the pin 41 rotatably supported in vertically extending position in the bearings 42 and 43 secured within the plate member 36 and cover 14 respectively. Secured to the shaft 41 directly above the ratchet wheel 40 is a cam member 44 the outer surface of which is formed to the shape of a spiral as indicated on Fig. 2, it being provided with a radial shoulder 45 at the point where the spiral surface begins and finishes.

A second pawl 46 rotatably supported on the pin 47 secured in the plate 36 is urged by the spring 47ª into contact with the ratchet 40 in order to prevent reverse movement of the same. A pin 48 fixed in the plate 36 adjacent the rear wall of the casing 13 rotatably receives thereon a bell crank comprising the forwardly extending arm 49 and transversely extending arm 50, the arm 49 extending forwardly into contact with the cam 44 and being urged into contact with the same by means of the spring 51. The free end of the arm 50 is provided with a pawl member 52 pivotally secured thereto by means of the pin 53, a spring 54 being provided to constantly urge the pawl member 52 into contact with the ratchet wheel 55 which is secured to the shaft 56 and which in turn is rotatably supported between the cover 14 and plate 36 in the bushings 57 and 57′ respectively. The upper end of the shaft 56 projects through the lower wall of the cylinder 18 and secured thereto within the cylinder 18 is the bevel gear 58 in meshing relationship with the bevel gear 31. A pawl 59 rotatably supported on the pin 60 is constantly urged by the spring 61 into contact with the ratchet wheel in order to prevent reverse movement thereof.

The operation of the device thus far described is as follows: Upon reciprocation of the member 10 the inertia of the mass 15 due to the reciprocation of the member 10 causes the mass 15 to reciprocate backwards and forwards in the casing 13. As the mass 15 reciprocates it carries the pin 37 and pawl 39 with it, the elongated opening 38 in the plate 36 allowing this movement. As the pawl 39 moves back and forth with the weight or mass 15 it engages the teeth of the ratchet 40 and causes rotation of the ratchet 40. In rotating the ratchet 40 rotates the cam 44 therewith and as the cam 44 rotates the outer end of the lever 49 is moved outward by its cam surface until the shoulder 45 is reached, at which time the spring 51 forces the end of the lever 49 back into contact with the inner portion of the cam surface. It will thus be apparent that a relatively great number of reciprocations of the weight 15 are necessary to cause a complete revolution of the ratchet wheel 40 and to cause the outer end of the lever 49 to move outwardly and inwardly in accordance therewith. As the outer end of the lever 49 moves outwardly the outer end of the lever 50 moves forwardly, carrying with it the pawl 52 which because of its engagement with the ratchet wheel 53, causes the ratchet wheel 53 to rotate a corresponding amount. I find it preferable to so proportion the cam 44 with respect to the levers 49 and 50, that for each complete rotation of the cam 44 the pawl 52 is moved sufficiently to cause the ratchet wheel 55 to rotate a distance measured on its circumference equal to or slightly greater than the distance between two adjacent teeth on the ratchet wheel 55, whereby the pawl 52 will be caused to engage each of those teeth in turn. Thus for each complete revolution of the ratchet wheel 44 the pawl 52 causes the ratchet wheel 55 to turn an amount measured on its circumference by the distance between each adjacent pair of teeth so that in order to cause one complete revolution of the ratchet wheel 55 the cam 44 must rotate a number of times equal to the number of teeth on the ratchet wheel 55. As the ratchet wheel 55 thus rotates the bevel gear 58 is caused to rotate in exact accordance with the same, and as the gear 58 meshes with the gear 31, the gear 31 is likewise caused to rotate at a rate proportional to the respective number of teeth on the gears 31 and 58. As gear 31 rotates and carries the sleeve 30 therewith, the rod 27 is drawn through the head 25 and the piston 28 is moved forwardly in the cylinder 18, forcing before it any grease that may be within the cylinder 18, such grease being led through the passages 20, 21 and 23 to the journal 12.

Inasmuch as it may be found necessary to feed varying amounts of grease to the journal 12 I provide means for accomplishing this result as follows: I form the rear edge of mass 15 at an angle to the side face thereof and to the rear face of the casing 13 and providing a plurality of depressions or serrations 62 therein. I then position within the casing 13 and in contact with the rear plate 65 thereof a block or stop member 63 of substantially less width than the interior width of the casing 13, the block being provided with a forward face complementary to the rear face 62 of the mass 15, and provide it with depressions or serrations 64 complementary to the depressions 62. The block 63 is resiliently and frictionally mounted in contact with the liner 65 for the rear face of the casing 13 by means of the screw 66 which projects through the elongated slot 67 in the rear wall of the casing 13 and liner 65 and which receives between its head and the outer face of the casing 13 a spring member 68 which frictionally engages the outer face of the casing 13. It will be apparent from Fig. 3 that by moving the block 63 over to the opposite side of the casing 13 from the position in which it is shown, the relative space between the block 63 and the mass 15, when the mass 15 is in its extreme forward position, will be increased to a maximum value, and that when the block 63 is in the position shown in Fig. 3, the space between the block 63 and the mass 15 will be of minimum value. This spacing is variable by shifting the block 63 from one side of the casing 15 to the other, and as the space between the block 63 and mass 15 limits the distance which the mass 15 may reciprocate through, the shifting of the block 63 controls the amount of reciprocation of the mass 15. By moving the block 63 to the position indicated in Fig. 3 I am enabled to limit the amount of reciprocating movement of the weight 15 so that the pawl 39 will move only sufficiently to engage but one tooth of the ratchet wheel 40 upon each reciprocation of the weight 15, and when moved to the opposite side of the casing 13 from that shown in Fig. 3 the mass 15 will be permitted to reciprocate a sufficient distance to enable the pawl 39 to engage each alternate tooth on the ratchet wheel 40, thus doubling the amount of grease ejected by the piston 28 from the cylinder 18 than where the block 63 is positioned so that the pawl 39 engages each tooth of the ratchet wall 40 separately.

In order to prevent damage to the mechanism by continued operation of the device after the piston 28 has reached the outer limit of its travel, I provide means for nullifying the operation of the device at such time as follows: I provide an extension 69 on the pawl 52 projecting therefrom on the opposite side of the pin 53 and lying adjacent relationship to the liner 65 for the rear face of the casing 13. I then provide a pin 70 slidably projecting through the rear wall of the casing 13 and liner 65 and into engageable relationship with the free end of the extension arm 69, the pin 70 being held out of engagement therewith by means of the spring 71. I then provide a cross pin, handle or other member 72 on the outer end of the rod 27 in such a position that when the rod 27 has moved forwardly an amount sufficient to bring the piston 28 to the extreme end of its travel as indicated in dotted lines in Fig. 1, the member 72 will engage the pin 70 as indicated in dotted lines in Fig. 1 and will move the pin 70 forwardly, causing it to engage the extension 69 and move the arm 52 out of contact with the ratchet wheel 55. Thereafter, the movement of the arm 69 and pawl 52 will not operate to rotate the ratchet wheel 55 and consequently further travel of the piston 28 will be prevented. The piston 28 may be returned to its original position by pulling the pin 32 out of engagement with the slot 35 against the pressure of the spring 34, and rotating the rod 27 by means of the member 72, after which the interior of the cylinder 18 may be refilled with lubricant by removing the cap 24.

In a device of this type should the cylinder 18 be placed in such thermal contact with the member 10 that should the member 10 become over-heated for any reason the heat therefrom would be conducted to the cylinder or grease cup 18 in sufficient amounts to melt the grease therein, such grease might be prematurely exhausted, causing consequent failure of lubrication and burning out of the bearing. It is for this reason that I prefer to secure the cylinder 18 to the cover 14 only in line contact whereby a minimum of heat conducting area is provided which may transfer the heat of the bearing through the casing 13 to the cylinder 18.

Figures 5, 6:
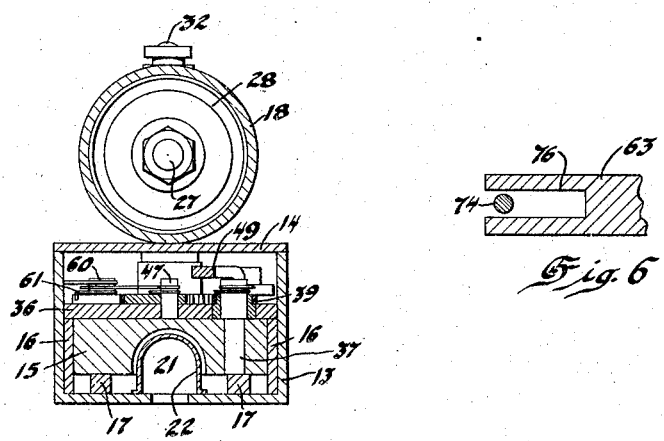
Fig. 5 is a view taken on the line 5—5 of Fig. 2.
Fig. 6 is a fragmentary view taken on the line 6 of Fig. 3, showing the manner in which the sliding block is slotted to allow the rod of the damper piston to extend through the same.

It will be apparent that when the mass 15 is moving forwardly, the force of its movement is broken by the resistance set up in moving the mechanism operated by it, and that on its return movement such resistance is not effective. Were no means provided to break the force of the rearward movement of the mass 15, the mass would strike the block 63 at high speeds of the member 10 with a force that might permanently damage the device. To obviate any danger from this source I provide a means for damping the force of the blow as follows: A blind opening 73 is provided in the rear face of the mass 15 with its axis parallel to the line movement of the mass. A rod 74 is secured in the rear wall of the casing 13 against axial movement and extends forwardly into the opening 73 where it is provided with a piston 75 which has a relatively loose or "sloppy" fit with the opening 73 which thereby acts as a cylinder. The clearance between the piston 75 and opening 73 is such that for relatively slow movements of the mass 15 substantially no restriction of the free movement of the mass 15 occurs, but at higher speeds the air is trapped between the piston 75 and the end of the opening 73 and serves to cushion or dampen the force of the mass 15 as it comes back into contact with the block 63. The block 63 is slotted as indicated at 76 in Fig. 6 in order to provide clearance for the rod 74 and in order to allow unrestricted sliding movement of the block 63 past the rod 74.

While I show a preferred embodiment of the present invention in the accompanying drawings it will be apparent that the construction shown may be subject to a variety of modifications, and formal changes may be made in the specific embodiment of the invention described without departing from the spirit or substance of the broad invention, the scope of which is commensurate with the appended claims.

What I claim is:—

1. In combination, a casing and a grease cup, a piston within said grease cup, a rod secured to said piston for causing movement thereof, means for locking said rod against rotation without preventing axial movement thereof, an axially fixed gear threadably engaging said rod, a weight within said casing reciprocable therein by inertia forces acting thereon, means actuated by reciprocation of said weight for rotating said gear, and adjustable means for limiting the reciprocating movement of said weight, said means comprising a member movable transversely to the path of movement of said weight and provided with an angular face engageable with a corresponding face on said weight, said angular face and said corresponding face being provided with serrations adapted for interlocking engagement with each other.

2. In combination, a casing and a grease cup, a piston within said grease cup, a rod secured to said piston for causing movement thereof, means for locking said rod against rotation without preventing axial movement thereof, an axially fixed gear threadably engaging said rod, a weight within said casing reciprocable therein by inertia forces acting thereon, means actuated by reciprocation of said weight for rotating said gear, and adjustable means for limiting the reciprocating movement of said weight, said means comprising a member movable transversely to the path of movement of said weight and provided with an angular face engageable with a corresponding face on said weight, and means for frictionally holding said member in transversely adjusted position.

3. In combination, a casing and a grease cylinder, a weight reciprocable in said casing, a ratchet wheel, a pawl secured to said weight and movable therewith engageable with said ratchet wheel for causing rotation thereof, a cam rotatable with said ratchet wheel, a piston within said cylinder, and means extending between said cam and said piston for causing movement of said piston upon rotation of said cam.

4. In combination, a casing and a grease cylinder, a weight reciprocable in said casing, a ratchet wheel, a pawl secured to said weight and moveable therewith engageable with said ratchet wheel for causing rotation thereof, a cam rotatable with said ratchet wheel, a piston within said cylinder, and means extending between said cam and said piston for causing movement of said piston upon rotation of said cam, said means including a bell crank one end of which engages said cam and the other of which carries a pawl, a second ratchet wheel rotatable by movement of the last mentioned pawl, and a gear rotating with the second ratchet wheel meshing with a gear operatively connected to said piston.

5. In combination, a casing and a grease cylinder, a weight reciprocable in said casing, a ratchet wheel, a pawl secured to said weight and movable therewith engageable with said ratchet wheel for causing rotation thereof, a cam rotatable with said ratchet wheel, a piston within said cylinder, a rod secured to said piston, means for preventing rotation of said rod, a member threadably engaging said rod and held against axial movement, and means extending between said cam and said member for causing rotation of said member upon rotation of said cam, said means including a bell crank one end of which engages said cam and the other of which carries a pawl, a second ratchet wheel rotatable by movement of the last mentioned pawl, a gear rotating with the second ratchet wheel meshing with a gear secured to said member, and means for causing disengagement of said last mentioned pawl with said second ratchet wheel when said piston has moved a predetermined distance in said cylinder.

6. In combination, a casing and a grease cup, a piston within said grease cup, a rod secured to said piston for causing movement thereof, a weight within said casing reciprocable therein by inertia forces acting thereon, means actuated by reciprocation of said weight for moving said rod, said weight being provided with an opening, and a fixed piston engaging said opening for damping movement of said weight, said piston being generally spaced from the walls of said opening.

7. In combination, a casing and a grease cup, a piston within said grease cup, a rod secured to said piston for causing movement thereof, a weight within said casing reciprocable therein by inertia forces acting thereon, means actuated by reciprocation of said weight for moving said rod, a cylinder formed in said weight with its axis in line with the direction of movement of said weight, and a fixed piston loosely engaging said cylinder.

8. In a lubricating device, a grease container, a piston movable therein, an inertia actuated reciprocable mass, means actuated by movement of said mass in one direction for moving said piston in said container, and means for damping the movement of said mass in the opposite direction, said damping means offering increased resistance to the movement of said mass with increased speed of said mass and comprising a cylinder and piston having relative movements in accordance with the movement of said mass, the last mentioned piston loosely fitting said cylinder whereby air may escape from said cylinder past said last mentioned piston during relatively slow movements of said mass without building up a material pressure in said cylinder.

9. In an inertia actuated lubricating device, in combination, a casing, a weight reciprocable therein, a ratchet wheel rotatable therein, a ratchet arm carried by said weight in engageable relation with said ratchet wheel, a cam rotatable with said ratchet wheel, a grease cylinder, a piston in said cylinder, a pivoted arm oscillatable by said cam, and means operated by the oscillation of said arm for moving said piston in said cylinder.

DEYO JONES.